United States Patent
Deming

[15] 3,683,480
[45] Aug. 15, 1972

[54] METHOD AND APPARATUS FOR CALIBRATING A SPRING
[72] Inventor: Andrew F. Deming, 12660 Beech St. N.E., Alliance, Ohio 44601
[22] Filed: June 22, 1970
[21] Appl. No.: 48,259

Related U.S. Application Data

[62] Division of Ser. No. 803,159, Feb. 28, 1969, Pat. No. 3,559,477, which is a division of Ser. No. 607,211, Jan. 4, 1967, abandoned.

[52] U.S. Cl....................29/173, 73/1 R, 73/141 AB, 140/89
[51] Int. Cl..........................B21f 35/00, B23p 13/00
[58] Field of Search.........29/173; 140/89; 33/147 D; 73/1 B, 1 R, 161, 141 A, 141 AB

[56] References Cited

UNITED STATES PATENTS

| | | | |
|---|---|---|---|
| 174,496 | 3/1876 | Dimock | 73/141 AB |
| 313,706 | 3/1885 | Borchardt | 140/89 |
| 791,752 | 6/1905 | Daniels et al. | 29/173 |
| 1,700,170 | 1/1929 | Larned | 29/173 |
| 1,906,449 | 5/1933 | Dedrick et al. | 29/173 |

Primary Examiner—John F, Campbell
Assistant Examiner—Victor A. DiPalma
Attorney—Woodling, Krost, Granger and Rust

[57] ABSTRACT

A spring calibration method and apparatus is disclosed to precisely calibrate a spring prior to its assembly into the end-use device. A calibrated weight is hung to act by gravity on a coil tension spring thus stretching it and stressing it to a condition of static equilibrium to support the weight. Two reference points are marked on the end portions of the spring and vices may be used for this purpose to mark the locations of these first and second reference points and also these vices may be used to bend permanent hooks on the end portions so that the spring may be mounted in the end-use device by these hooks. The vices are a precise gauge distance apart so that when the spring is subsequently stressed to have these hooks again spaced apart this predetermined distance, then it will be known that the spring is developing this predetermined force. An example is that the spring may be assembled into a speed control governor by means of the hooks and the governor will thus be precisely calibrated. This establishes a predetermined force on the governor movable contact to thus establish a predetermined speed of operation of the governor without necessity for adjusting or calibrating anything in the governor after assembly and without necessity for running the governor to adjust the speed of operation. Also successive governors will be operable at a predetermined speed within close limits despite variations in springs in successive governors. The foregoing abstract is merely a resume of one general application, is not a complete discussion of all principles of operation or applications, and is not to be construed as a limitation on the scope of the claimed subject matter.

27 Claims, 4 Drawing Figures

United States Patent
Deming
[15] 3,683,480
[45] Aug. 15, 1972
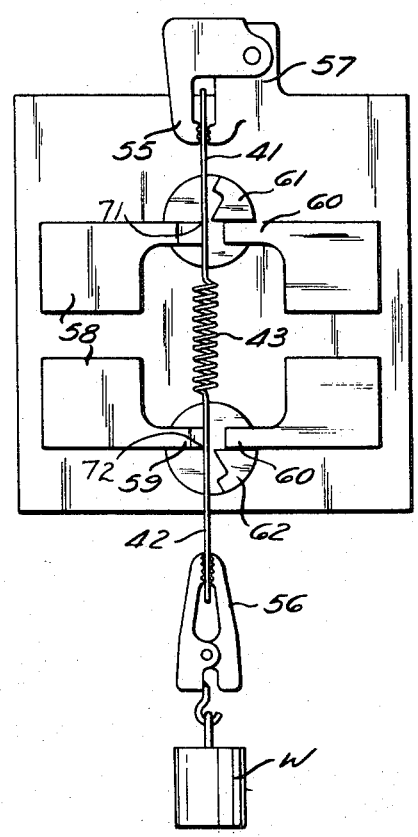

PATENTED AUG 15 1972

3,683,480

INVENTOR.
ANDREW F. DEMING
BY Woodling, Krost,
Granger and Rust
ATTORNEYS

METHOD AND APPARATUS FOR CALIBRATING A SPRING

This is a division of my application Ser. No. 803,159, filed Feb. 28, 1969, now Pat. No. 3,559,477 which in turn is a division of my application Ser. No. 607,211, filed Jan. 4, 1967, now abandoned.

BACKGROUND OF THE INVENTION

1. Field of Invention

This invention relates to the spring calibration method and apparatus so that the calibrated springs may be used in centrifugal switches wherein centrifugal force during rotation of the mechanism acts on a movable weight or mass to cause it to move outwardly from the axis of rotation against a resilient force and to actuate an electrical switch.

2. Description of the Prior Art

The centrifugal switch of the present invention may be utilized in governors, for example, in small electric motors in applications similar to those shown in U. S. Nos. 2,883,598, RE 24,780; 2,936,412 and 3,268,682.

In the prior art it has been difficult to assemble a centrifugal switch or a governor which operates at a precisely controlled speed. Accordingly, some adjustment has been necessary to adjust the speed of operation and it has been necessary to provide access to this speed adjustment from the outside of the mechanism so that the mechanism may be stopped, rotated to permit access, adjusted, and restarted to again check the speed of operation. This has necessitated considerable manual labor in adjusting and calibrating the devices to attain the proper speed of operation.

BRIEF SUMMARY OF THE INVENTION

The invention may be incorporated in the method of calibrating a spring comprising, the steps of, establishing a gauge distance, providing a calibrated weight of a predetermined value, mounting said weight to act by gravity on the spring to stress the spring to establish a predetermined force therein sufficient to support said weight in static equilibrium, and establishing first and second reference points spaced apart on the spring a distance corresponding to said gauge distance.

Accordingly, an object of the invention is to provide a means to precisely calibrate a spring so that it is pre-calibrated before use in the device in which it is intended to be used.

Another object of the invention is to provide a spring calibration method and apparatus to mark first and second reference points on a spring while it is stressed with the reference points spaced a predetermined distance apart so that later when a spring is installed in a device, and the spring is stressed to the extent that the reference points are again spaced apart said predetermined distance, it will be known that the spring is developing a predetermined force.

Another object of the invention is to provide an apparatus to mark reference points and to form hooks on a tensioned spring at such reference points.

Another object of the invention is to provide a centrifugal switch which operates at a precisely controlled speed of operation.

Other objects and a fuller understanding of the invention may be had by referring to the following description and claims, taken in conjunction with the accompanying drawings.

DETAILED DESCRIPTION

Figure 1:
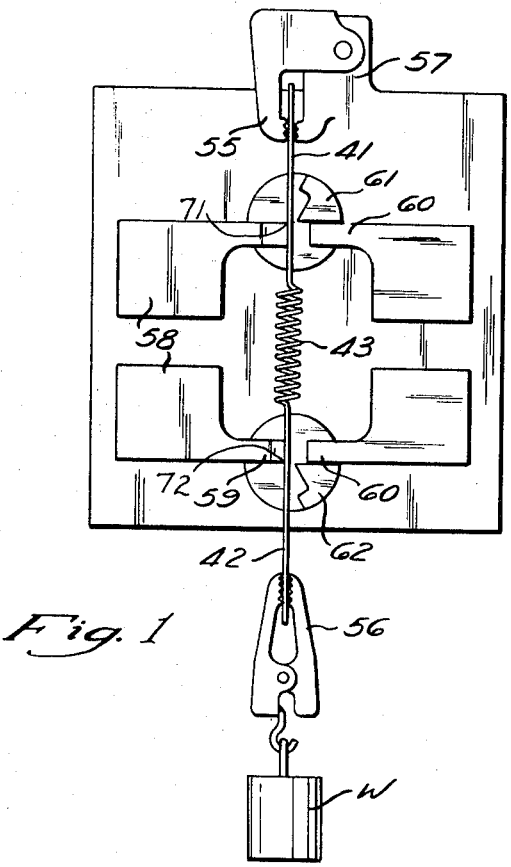
FIG. 1 is a diagrammatic view of a fixture for calibrating the spring.

A spring 40 is illustrated in this preferred embodiment as a coil tension spring having a coil body 43 and first and second end portions 41 and 42, respectively. First and second hooks or spring anchors 45 and 46 are provided on the end portions 41 and 42, respectively.

The spring force varies in accordance with a number of factors including:

1. The gauge of the wire.
2. The number of turns in the coil body 43.
3. The tightness of wrap between successive coils.
4. The length of the spring between hooks 45 and 46.
5. The stiffness of the wire.
6. The straightness of the contact arm in the end use device, such as a governor.

With respect to the group of factors relating to the spring force, it has been found that it was impossible to obtain from a spring manufacturer a group of springs all of which had the same spring force when being stressed the same distance. The variables numbered (1) to (5) made a variation of about 20 per cent in the force of the various springs when stressed to a precise spacing of the hooks 45 and 46.

Accordingly, when such springs were assembled into a complete governor, this 20 per cent variation in spring force caused about a 20 per cent variation in speed. Accordingly, the prior art governors relied upon some adjustment such as adjustment of the fixed contacts or spring stress in order to be able to set this governor for the desired operating speed. This required hand calibration and adjustment of the governor, required the motor be set up and run to observe the governed speed and then stopping the motor, turning the rotor to permit access to an adjusting screw through a hole in the case from outside the motor, adjusting something and again trying the motor with further adjustments if necessary. All of this hand labor for calibration and adjustment was costly in time, and hence made the motor more expensive. The present invention does away with the need for calibrating the governor speed after assembly and there is no need to set up the motor to check the calibrated speed. The calibration is done by calibrating the spring force prior to assembly so that when the anchors 45 and 46 are stretched apart a predetermined distance, then it will be known that the spring 40 does develop a predetermined force.

Figure 2:
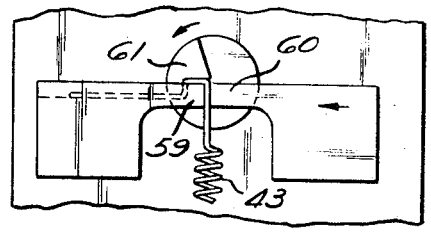
FIG. 2 is a further diagrammatic view showing the fixture in use.
Figure 3:
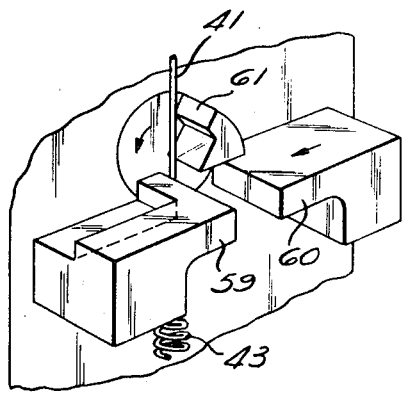
FIG. 3 is perspective view of the fixture.
Figure 4:
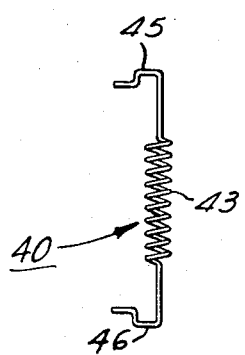
FIG. 4 is a plan view of the completed spring.

FIGS. 1, 2 and 3 illustrate the preferred method for calibrating the spring 40. The spring 40 is wound with a predetermined number of turns in the coil body 43 and is provided with long end portions 41 and 42. Temporary hooks may be provided on the end portions 41 and 42, or only on one end, or on neither end as shown. The spring may be hooked by the temporary hooks to the fixed support 57 and to a weight W. As shown in FIG. 1, spring claimps 55 and 56 may alternatively grip the extended wire end portions 41 and 42. The weight W is a precisely calibrated weight predetermined in accordance with the desired calibration. This weight W will stress the spring body 43 or effective portion of the spring a predetermined amount to establish a predetermined force therein sufficient to support the weight in static equilibrium. Next a vice 58 having jaws 59 and 60 is moved laterally in to grip the wire end portions 41 and 42 at first and second reference points. These reference points are precisely spaced apart. In one preferred example, they were 0.620inches apart and the weight was 74 grams. The spacing apart of these reference points may be considered to be a gauge distance and a first corner 71 on the upper vice jaw and a second corner 72 on the lower vice jaw 58 will establish these first and second reference points respectively. When the movable jaws 60 move laterally inwardly this may be used to mark the first and second reference points on the spring end portions 41 and 42. In this preferred embodiment it is desired to do more than just mark the spring, it is desired to concurrently form hooks thereon. Next rotary jaws 61 and 62 rotate laterally to form the permanent hooks 45 and 46 on the end portions 41 and 42, respectively. This is as illustrated in the partial views of FIGS. 2 and 3, moving from the position of FIG. 3 to that of FIG. 2. If temporary hooks were used on the ends of the end portions 41 and 42, the permanent hooks 45 and 46 would be intermediate the coil body 43 and the respective temporary hook. Shearing jaws next may shear away the temporary hooks or the extended lengths of wire ends 41 and 42 permitting the completed spring to appear as illustrated in FIG. 4 with the permanent hooks 45 and 46. Thus springs 40 are manufactured and pre-calibrated which develop a predetermined force when stretched a predetermined distance and this regardless of the stiffness of the wire, the gauge of the wire, the number of turns, the tightness of successive turns and the length between the temporary hooks. It has been found that such a method will produce springs of constant force within a tolerance of one per cent upon being stressed the predetermined distance. This tolerance of one per cent in the spring force plus the tolerance of about one-tenth per cent in the mass of the contact arm of a governor has been found to result in a tolerance of speed within 3 per cent, for successive end-use devices of governors manufactured, assembled and operated. This 3 per cent tolerance in speed, when used in a phonograph motor, for example, will meet the phonograph manufacturers' specifications for speed range between 33 and 34 rpm.

It is considered that a tolerance of 5 per cent in the mass of the contact arm together with a tolerance of 5 per cent in the spring force of spring 40 may achieve a tolerance of 5 per cent in the speed regulation and this in many instances may be sufficient. It will be considerably better than the prior art centrifugal switch governors wherein a tolerance of 20 per cent in the spring force and a tolerance of 20 per cent in the speed regulation was common.

The reference points gripped by the vice jaws 59 and 60 become reference point anchors after formation of the permanent hooks 45 and 46. An alternative would be to utilize one of the temporary hooks as a reference point and have it become a permanent hook. An example of this would be to have the temporary hook hooked onto the vice jaw 58 as shown in FIG. 2 and then have the coil body extending below this vice jaw to have the weight act thereon by gravity. This temporary hook would then become the permanent hook, especially after the excess end of the wire was cut off. Alternatively the other temporary hook could be a reference point, and hence this temporary hook could become a permanent hook. In either of these two alternatives, only one set of vice jaws, rotary jaws and shearing jaws would be required.

The calibrated weight W acts by gravity on the spring 40 and may act in many different manners but as shown it hangs and acts directly on this coil tension spring. The predetermined distance or gauge distance between the vice jaws establishes a corresponding distance to be marked on the end portions of the spring between the first and second reference points. In this preferred embodiment this distance as marked is equal to the gauge distance between the vice jaws. The upper jaws 59 and 60 may be considered a first vice and the lower jaws 59 and 60 may be considered a second vice, together constituting vice means to mark the first and second reference on the spring when it is in the stressed condition.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

I claim:

1. The method of calibrating a spring by using a gauge having first and second reference points spaced apart a predetermined gauge distance, comprising the steps of, providing a calibrated weight of a predetermined value, mounting said weight to act on the spring by gravity to stress a portion of the spring to establish a predetermined force therein sufficient to support said weight in static equilibrium, and relatively engaging said gauge and spring laterally with respect to each other to deform the spring at at least one of the reference points to establish said first and second reference points on opposite sides of the stressed portion of said spring.

2. The method of claim 1, wherein the spring is a wire member formed into a coil.

3. The method of claim 1, wherein the mounting step includes hanging said weight directly on the spring.

4. The method of claim 1, wherein the spring is a coil tension spring.

5. The method of claim 1, wherein the spring is formed from a wire coil having first and second end portions of the spring wire extending from the coil, and establishing first and second reference point anchors on said first and second end portions, respectively, spaced apart corresponding to said gauge distance with the spring in said stressed condition.

6. The method of claim 5, including mounting the spring in a device by means of said reference point anchors to establish said predetermined force in said spring upon said spring being stressed to have said anchors spaced apart said given gauge distance without need for calibration of the spring after assembly into the device of use.

7. The method in claim 5, wherein said first reference point anchor is a hook on said first end portion.

8. The method of claim 5, wherein said first and second reference point anchors are hooks on said first and second end portions, respectively.

9. The method of claim 8, wherein said hooks are spaced apart a distance equal to said gauge distance with the spring being stressed so that the predetermined force is established.

10. The method of claim 5, including establishing a temporary hook on said first end portion and establishing said second reference point on said second end portion a given distance from said hook.

11. The method of claim 5, including establishing temporary hooks at each end of the coil spring,
and wherein said mounting step includes,
hanging the calibrated weight on one temporary hook,
and hanging the other temporary hook on a fixed support to stretch the coil spring to support the weight in static equilibrium.

12. The method of claim 1, including forming the spring from a wire into a coil, establishing first and second end portions of the wire extending from the coil,
forming a first temporary hook on the end of said first end portion,
said mounting step including utilizing said first temporary hook to fasten said spring coil between a fixed support and said calibrated weight to stress the spring coil to establish the predetermined force therein,
said engaging step including establishing first and second reference points on said first and second end portions, respectively, spaced said gauge distance apart,
forming a second hook as a permanent hook at said second reference point,
and installing the spring in a device in a stressed condition by means of said permanent hook and said first reference point to thus establish said predetermined force in the spring upon said spring being stressed to have said permanent hook and said first reference point spaced apart said gauge distance.

13. The method of claim 12, wherein first and second temporary hooks are formed on the first and second end portions and first and second permanent hooks are formed at said first and second reference points with the permanent hooks being intermediate the spring coil and the respective temporary hook.

14. The method of claim 12, including grasping said first end portion in a vice at said first reference point, and utilizing said vice to bend the first permanent hook on said first end portion.

15. The method of claim 14, including cutting off the temporary hook.

16. The method of claim 12, including grasping said first and second end portions in first and second vices at said first and second reference points, and utilizing said vices to bend first and second permanent hooks.

17. Apparatus to calibrate a spring comprising, in combination,
a base,
a calibrated weight,
means mounting said calibrated weight to act by gravity on a spring relative to said base to stress the spring to establish a predetermined force therein sufficient to support said weight in static equilibrium,
and means establishing reference points a predetermined distance apart at two locations on opposite sides of the effective portion of the spring in the stressed condition, including vice means and means relatively moving the spring and said vice means toward each other to deform the spring and establish at least one of said reference points on said spring.

18. The apparatus of claim 17, wherein the spring is formed from a wire member and is formed into a coil.

19. The apparatus of claim 17, including means in said mounting means to hang said weight directly on the spring.

20. The apparatus of claim 17, wherein the spring is a wire coil having first and second end portions of the spring wire extending from the coil,
and said reference points establishing means establishing first and second reference point anchors on said first and second end portions respectively spaced apart said predetermined distance with the spring in said stressed condition.

21. The apparatus in claim 20, including means in said reference points establishing means to form a hook as said first reference point anchor on said first end portion.

22. The apparatus of claim 20, including means in said reference points establishing means to form first and second hooks as said first and second reference point anchors.

23. The apparatus of claim 20, wherein said mounting means includes means to temporarily attach said first end portion to said base,
and means establishing at least one of said anchors as a hook.

24. The apparatus of claim 23, wherein said mounting means includes means to temporarily hang the calibrated weight on said second end portion.

25. The apparatus of claim 17, wherein the spring is a coil tension spring having first and second end portions extending from the coil,
said mounting means including means to attach said first end portion of said spring to said base,
said mounting means including means to attach said calibrated weight to said second end portion to have said calibrated weight hang by gravity to stress the spring coil to establish the predetermined force therein,
and said vice means deforming the spring to mark first and second reference points on said first and second end portions, respectively.

26. The apparatus of claim 25, including a first vice in said vice means to grasp said first end portion to bend a first permanent hook at said first reference point.

27. The apparatus of claim 25, including a second vice in said vice means to grasp said second end portion to bend a second permanent hook at said second reference point.

* * * * *